(12) United States Patent
Jones et al.

(10) Patent No.: US 11,983,983 B2
(45) Date of Patent: May 14, 2024

(54) GAMING MACHINE AND METHOD WITH MOVING PERSISTENT SYMBOLS AND WIN ZONE FEATURE

(71) Applicant: LNW Gaming, Inc., Las Vegas, NV (US)

(72) Inventors: Colbee V. Jones, Reno, NV (US); Kenneth Shawn Soong, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 25 days.

(21) Appl. No.: 17/579,697

(22) Filed: Jan. 20, 2022

(65) Prior Publication Data

US 2023/0230440 A1 Jul. 20, 2023

(51) Int. Cl.
*G07F 17/32* (2006.01)
*G06F 7/58* (2006.01)

(52) U.S. Cl.
CPC .......... *G07F 17/3213* (2013.01); *G06F 7/588* (2013.01); *G07F 17/3267* (2013.01)

(58) Field of Classification Search
CPC ... G07F 17/3213; G07F 17/3267; G07F 17/34
See application file for complete search history.

(56) References Cited

U.S. PATENT DOCUMENTS

| | | |
|---|---|---|
| 3,733,075 A | 5/1973 | Hooker et al. |
| 4,198,052 A | 4/1980 | Gauselmann |
| 4,732,386 A | 3/1988 | Rayfiel |
| 5,100,137 A | 3/1992 | Fulton |
| 5,152,529 A | 10/1992 | Okada |
| 5,205,555 A | 4/1993 | Hamano |
| 5,342,047 A | 8/1994 | Heidel et al. |
| 5,356,140 A | 10/1994 | Dabrowski et al. |

(Continued)

FOREIGN PATENT DOCUMENTS

| | | |
|---|---|---|
| AU | 2001055957 A1 | 3/2002 |
| AU | 2013251288 A1 | 5/2014 |

(Continued)

OTHER PUBLICATIONS

Ancient Arcadia game brochure, Copyright 2011 IGT.

(Continued)

*Primary Examiner* — Justin L Myhr

(57) ABSTRACT

There is provided a gaming system, gaming machine, and method that presents a plurality of symbols in an array corresponding to a plurality of symbol-bearing reels. Game-logic circuitry positions a persistent symbol at a first symbol position in the array. Using a random number generator, the game logic-circuitry spins and stops the reels. Concurrently with the moving of the reels, the game-logic circuitry moves the persistent symbol from the first symbol position in the array to a second symbol position in the array. The game-logic circuitry moves the persistent symbol in a direction toward a win zone outside of the array. The game-logic circuitry further determines whether a catalyst symbol appears in the win zone. In response to determining that the catalyst symbol appears in the win zone, the game-logic circuitry awards a value associated with the persistent symbol.

20 Claims, 7 Drawing Sheets

(56) References Cited

U.S. PATENT DOCUMENTS

| | | |
|---|---|---|
| 5,393,061 A | 2/1995 | Manship et al. |
| 5,395,111 A | 3/1995 | Inoue |
| 5,431,408 A | 7/1995 | Adams |
| 5,511,781 A | 4/1996 | Wood et al. |
| 5,618,232 A | 4/1997 | Martin |
| 5,695,188 A | 12/1997 | Ishibashi |
| 5,704,835 A | 1/1998 | Dietz |
| 5,722,891 A | 3/1998 | Inoue |
| 5,752,881 A | 5/1998 | Inoue |
| 5,766,074 A | 6/1998 | Cannon et al. |
| 5,788,573 A | 8/1998 | Baerlocher et al. |
| 5,807,177 A | 9/1998 | Takemoto et al. |
| 5,810,665 A | 9/1998 | Takemoto et al. |
| 5,833,537 A | 11/1998 | Barrie |
| 5,848,932 A | 12/1998 | Adams |
| 5,855,515 A | 1/1999 | Pease et al. |
| 5,876,284 A | 3/1999 | Acres et al. |
| 5,882,259 A | 3/1999 | Holmes et al. |
| 5,882,261 A | 3/1999 | Adams |
| 5,890,962 A | 4/1999 | Takemoto |
| 5,911,418 A | 6/1999 | Adams |
| 5,947,820 A | 9/1999 | Morro et al. |
| 5,951,397 A | 9/1999 | Dickinson |
| 5,988,638 A | 11/1999 | Rodesch et al. |
| 6,004,207 A | 12/1999 | Wilson et al. |
| 6,027,115 A | 2/2000 | Griswold et al. |
| 6,033,307 A | 3/2000 | Vancura |
| 6,048,269 A | 4/2000 | Burns et al. |
| 6,050,895 A | 4/2000 | Luciano et al. |
| 6,056,642 A | 5/2000 | Bennett |
| 6,089,976 A | 7/2000 | Schneider et al. |
| 6,089,977 A | 7/2000 | Bennett |
| 6,102,798 A | 8/2000 | Bennett |
| 6,120,031 A | 9/2000 | Adams |
| 6,142,873 A | 11/2000 | Weiss et al. |
| 6,159,097 A | 12/2000 | Gura |
| 6,162,121 A | 12/2000 | Morro et al. |
| 6,168,520 B1 | 1/2001 | Baerlocher et al. |
| 6,186,894 B1 * | 2/2001 | Mayeroff ............... G07F 17/34 463/16 |
| 6,203,429 B1 | 3/2001 | Demar et al. |
| 6,213,875 B1 | 4/2001 | Suzuki |
| 6,224,482 B1 | 5/2001 | Bennett |
| 6,224,483 B1 | 5/2001 | Mayeroff |
| 6,224,484 B1 | 5/2001 | Okuda et al. |
| 6,227,971 B1 | 5/2001 | Weiss |
| 6,241,607 B1 | 6/2001 | Payne et al. |
| 6,251,013 B1 | 6/2001 | Bennett |
| 6,270,411 B1 | 8/2001 | Gura et al. |
| 6,270,412 B1 | 8/2001 | Crawford et al. |
| 6,290,600 B1 | 9/2001 | Glasson |
| 6,309,300 B1 | 10/2001 | Glavich |
| 6,319,124 B1 | 11/2001 | Baerlocher et al. |
| 6,375,567 B1 | 4/2002 | Acres |
| 6,375,570 B1 | 4/2002 | Poole |
| 6,413,162 B1 | 7/2002 | Baerlocher et al. |
| 6,481,713 B2 | 11/2002 | Perrie et al. |
| 6,517,432 B1 | 2/2003 | Jaffe |
| 6,517,433 B2 | 2/2003 | Loose et al. |
| 6,537,150 B1 | 3/2003 | Luciano et al. |
| 6,544,120 B2 | 4/2003 | Ainsworth |
| 6,547,242 B1 | 4/2003 | Sugiyama et al. |
| 6,551,187 B1 | 4/2003 | Jaffe |
| 6,554,704 B2 | 4/2003 | Nicastro et al. |
| 6,558,254 B2 | 5/2003 | Baelocher et al. |
| 6,561,900 B1 | 5/2003 | Baerlocher et al. |
| 6,561,904 B2 | 5/2003 | Locke et al. |
| 6,565,434 B1 | 5/2003 | Acres |
| 6,641,477 B1 | 11/2003 | Dietz |
| 6,652,378 B2 | 11/2003 | Cannon et al. |
| 6,656,040 B1 | 12/2003 | Brosnan et al. |
| 6,657,923 B2 | 12/2003 | Laughlin |
| 6,692,356 B2 | 2/2004 | Baerlocher et al. |
| 6,702,675 B2 | 3/2004 | Poole et al. |
| 6,731,313 B1 | 5/2004 | Kaminkow |
| 6,786,818 B1 | 9/2004 | Rothschild et al. |
| 6,832,957 B2 | 12/2004 | Falconer |
| 6,837,790 B1 | 1/2005 | Kaminkow |
| 6,869,360 B2 | 3/2005 | Marks et al. |
| 6,896,617 B2 | 5/2005 | Daly |
| 6,910,962 B2 | 6/2005 | Marks et al. |
| 6,916,243 B2 | 7/2005 | Yoshida |
| 6,918,834 B2 | 7/2005 | Vancura |
| 6,926,609 B2 | 8/2005 | Martin |
| 6,960,134 B2 | 11/2005 | Hartl et al. |
| 7,018,293 B2 | 3/2006 | Brown et al. |
| 7,029,395 B1 | 4/2006 | Baerlocher |
| 7,029,396 B2 | 4/2006 | Jaffe et al. |
| 7,121,945 B2 | 10/2006 | Suganuma et al. |
| 7,147,559 B2 | 12/2006 | Englman |
| 7,156,740 B2 | 1/2007 | Kaminkow |
| 7,179,169 B2 | 2/2007 | Beaulieu et al. |
| 7,252,591 B2 | 8/2007 | Van Asdale |
| 7,316,613 B2 | 1/2008 | Luccesi et al. |
| 7,371,170 B2 | 5/2008 | Cregan et al. |
| 7,377,850 B2 | 5/2008 | Shackelford et al. |
| 7,431,646 B2 | 10/2008 | Jackson |
| 7,452,276 B2 | 11/2008 | Loose et al. |
| 7,458,890 B2 | 12/2008 | Loose et al. |
| 7,488,252 B2 | 2/2009 | Griswold et al. |
| 7,503,847 B2 | 3/2009 | Baerlocher |
| 7,526,736 B2 | 4/2009 | Kaminkow et al. |
| 7,553,231 B2 | 6/2009 | Rodgers et al. |
| 7,578,735 B2 | 8/2009 | Frizzell et al. |
| 7,601,062 B2 | 10/2009 | Cole et al. |
| 7,604,538 B2 | 10/2009 | Pacey |
| 7,618,319 B2 | 11/2009 | Casey et al. |
| 7,625,278 B2 | 12/2009 | Paulsen et al. |
| 7,654,895 B2 | 2/2010 | Pacey |
| 7,654,899 B2 | 2/2010 | Durham et al. |
| 7,699,699 B2 | 4/2010 | Gilliland et al. |
| 7,704,141 B1 | 4/2010 | Marks et al. |
| 7,744,460 B2 | 6/2010 | Walker et al. |
| 7,785,191 B2 | 8/2010 | Marks et al. |
| 7,789,744 B2 | 9/2010 | Fiden |
| 7,841,934 B2 | 11/2010 | Gauselmann |
| 7,980,936 B2 | 7/2011 | Mead |
| 8,021,223 B2 | 9/2011 | Rose |
| 8,021,225 B2 | 9/2011 | Okada |
| 8,057,303 B2 | 11/2011 | Rasmussen et al. |
| 8,066,563 B1 | 11/2011 | Schultz et al. |
| 8,083,581 B2 | 12/2011 | Marks et al. |
| 8,105,145 B2 | 1/2012 | Jaffe |
| 8,105,151 B2 | 1/2012 | Caputo et al. |
| 8,113,940 B2 | 2/2012 | Hornik |
| 8,147,322 B2 | 4/2012 | Walker et al. |
| 8,162,740 B2 | 4/2012 | Aoki |
| 8,162,741 B2 | 4/2012 | Wadleigh et al. |
| 8,192,275 B2 | 6/2012 | Aoki et al. |
| 8,226,459 B2 | 7/2012 | Barrett et al. |
| 8,246,442 B1 | 8/2012 | Barrie |
| 8,272,938 B2 | 9/2012 | Gilmore et al. |
| 8,287,357 B2 | 10/2012 | Evans |
| 8,323,091 B2 | 12/2012 | Frank et al. |
| 8,357,041 B1 | 1/2013 | Saunders |
| 8,360,851 B2 | 1/2013 | Aoki et al. |
| 8,366,538 B1 | 2/2013 | Saunders et al. |
| 8,371,930 B1 | 2/2013 | Saunders et al. |
| 8,388,432 B2 | 3/2013 | Mattice et al. |
| 8,414,380 B2 | 4/2013 | Saunders et al. |
| 8,465,358 B2 | 6/2013 | Kemper |
| 8,496,522 B2 | 7/2013 | Caputo et al. |
| 8,512,121 B2 | 8/2013 | Macvittie et al. |
| 8,512,124 B2 | 8/2013 | Bramble et al. |
| 8,512,138 B2 | 8/2013 | Saunders |
| 8,523,659 B2 | 9/2013 | Evans |
| 8,574,059 B2 | 11/2013 | Rodgers et al. |
| 8,591,330 B2 | 11/2013 | Kelly et al. |
| 8,602,868 B2 | 12/2013 | Johnson et al. |
| 8,608,545 B2 | 12/2013 | Arora et al. |
| 8,662,986 B2 | 3/2014 | Rodgers et al. |
| 8,678,908 B2 | 3/2014 | Nicely |
| 8,690,660 B2 | 4/2014 | Saunders et al. |
| 8,696,434 B2 | 4/2014 | Tsukahara |

(56) References Cited

U.S. PATENT DOCUMENTS

| | | |
|---|---|---|
| 8,702,487 B2 | 4/2014 | Thomas |
| 8,771,054 B2 | 7/2014 | Aoki et al. |
| 8,790,169 B2 | 7/2014 | Saunders |
| 8,795,059 B2 | 8/2014 | Aoki et al. |
| 8,821,254 B2 | 9/2014 | Tsukahara |
| 8,834,258 B2 | 9/2014 | Gobe et al. |
| 8,851,974 B2 | 10/2014 | Caputo et al. |
| 8,870,642 B2 | 10/2014 | Leupp et al. |
| 8,882,578 B2 | 11/2014 | Saunders |
| 8,961,291 B2 | 2/2015 | Dias Pires et al. |
| 9,005,022 B2 | 4/2015 | Saunders |
| 9,011,233 B2 | 4/2015 | Ryan |
| 9,098,847 B2 | 8/2015 | Basallo et al. |
| 9,098,973 B2 | 8/2015 | Basallo et al. |
| 9,147,321 B2 | 9/2015 | Moody |
| 9,165,433 B2 | 10/2015 | Caputo |
| 9,177,447 B2 | 11/2015 | Zoltewicz et al. |
| 9,202,345 B2 | 12/2015 | Zoltewicz et al. |
| 9,214,011 B2 | 12/2015 | Wei et al. |
| 9,230,410 B2 | 1/2016 | Saunders et al. |
| 9,245,421 B2 | 1/2016 | Saunders et al. |
| 9,251,667 B2 | 2/2016 | Marks et al. |
| 9,257,017 B2 | 2/2016 | Saunders et al. |
| 9,262,895 B2 | 2/2016 | Rodgers et al. |
| 9,275,524 B2 | 3/2016 | Nicely |
| 9,299,224 B2 | 3/2016 | Leupp |
| 9,311,781 B2 | 4/2016 | Edwards |
| 9,349,251 B2 | 5/2016 | Caputo et al. |
| 9,355,528 B2 | 5/2016 | Nicely |
| 9,418,521 B1 | 8/2016 | Henrick et al. |
| 9,424,720 B2 | 8/2016 | Suda |
| 9,430,900 B2 | 8/2016 | Zoltewicz et al. |
| 9,466,169 B2 | 10/2016 | Basallo et al. |
| 9,474,972 B2 | 10/2016 | Lenger |
| 9,495,839 B2 | 11/2016 | Aoki et al. |
| 9,595,157 B2 | 3/2017 | Rasmussen et al. |
| 9,633,506 B2 | 4/2017 | Basallo et al. |
| 9,704,342 B2 | 7/2017 | Aoki et al. |
| 9,928,691 B2 | 3/2018 | Olive |
| 10,013,855 B2 | 7/2018 | Nakamura |
| 10,037,651 B2 | 7/2018 | You et al. |
| 10,043,350 B2 | 8/2018 | Gomez et al. |
| 10,062,237 B2 | 8/2018 | Devine et al. |
| 10,204,473 B2 | 2/2019 | Lenger |
| 10,242,533 B2 | 3/2019 | Okada et al. |
| 10,339,761 B2 | 7/2019 | Olive |
| 10,366,575 B2 | 7/2019 | Visser |
| 10,388,112 B2 | 8/2019 | You et al. |
| 10,410,472 B2 | 9/2019 | Moody |
| 10,417,877 B2 | 9/2019 | Gomez et al. |
| 10,475,294 B2 | 11/2019 | Gomez et al. |
| 10,497,203 B2 | 12/2019 | Elmqvist |
| 10,672,220 B2 | 6/2020 | Lenger |
| 10,706,664 B2 | 7/2020 | Boese et al. |
| 10,726,676 B2 | 7/2020 | You et al. |
| 10,769,888 B2 | 9/2020 | You et al. |
| 10,839,648 B2 | 11/2020 | Okada et al. |
| 10,957,161 B2 | 3/2021 | Chesworth et al. |
| 11,017,638 B2 | 5/2021 | Chesworth et al. |
| 2001/0021666 A1 | 9/2001 | Yoshida et al. |
| 2002/0016200 A1 | 2/2002 | Baerlocher et al. |
| 2002/0045474 A1 | 4/2002 | Singer et al. |
| 2002/0119818 A1 | 8/2002 | Savio et al. |
| 2002/0155881 A1 | 10/2002 | Yoshida |
| 2002/0183105 A1 | 12/2002 | Cannon et al. |
| 2003/0017865 A1 | 1/2003 | Beaulieu et al. |
| 2003/0027619 A1 | 2/2003 | Nicastro, Sr. |
| 2003/0035346 A1 | 2/2003 | Laughlin |
| 2003/0064782 A1 | 4/2003 | Beaulieu et al. |
| 2003/0064801 A1 | 4/2003 | Breckner et al. |
| 2003/0064802 A1 | 4/2003 | Rodgers et al. |
| 2003/0069063 A1 | 4/2003 | Bilyeu et al. |
| 2003/0130034 A1 | 7/2003 | Suganuma et al. |
| 2003/0157980 A1 | 8/2003 | Loose et al. |
| 2003/0216165 A1 | 11/2003 | Singer et al. |
| 2004/0012145 A1 | 1/2004 | Inoue |
| 2004/0023714 A1 | 2/2004 | Asdale |
| 2004/0043815 A1 | 3/2004 | Kaminkow |
| 2004/0048646 A1 | 3/2004 | Visocnik |
| 2004/0092315 A1 | 5/2004 | Boyd et al. |
| 2004/0137982 A1 | 7/2004 | Cuddy et al. |
| 2004/0171417 A1 | 9/2004 | Beaulieu et al. |
| 2004/0198489 A1 | 10/2004 | Kaminkow et al. |
| 2005/0054442 A1 | 3/2005 | Anderson et al. |
| 2005/0130731 A1 | 6/2005 | Englman et al. |
| 2005/0159208 A1 | 7/2005 | Pacey |
| 2006/0009286 A1 | 1/2006 | Durham et al. |
| 2006/0063588 A1 | 3/2006 | Poole |
| 2006/0111173 A1 | 5/2006 | Yang |
| 2006/0142080 A1 | 6/2006 | Enzminger |
| 2006/0189369 A1 | 8/2006 | Taylor |
| 2006/0205469 A1 | 9/2006 | Schultz et al. |
| 2006/0247002 A1 | 11/2006 | Yoshimi et al. |
| 2007/0060248 A1 | 3/2007 | Rodgers et al. |
| 2007/0060255 A1 | 3/2007 | Baerlocher et al. |
| 2007/0060275 A1 | 3/2007 | Gilmore et al. |
| 2007/0129135 A1 | 6/2007 | Marks et al. |
| 2007/0149267 A1 | 6/2007 | Ross et al. |
| 2007/0281784 A1 | 12/2007 | Seelig et al. |
| 2007/0287529 A1 | 12/2007 | Kojima |
| 2008/0003278 A1 | 1/2008 | Mondelo |
| 2008/0004532 A1 | 1/2008 | Rubey et al. |
| 2008/0032784 A1 | 2/2008 | Englman |
| 2008/0045298 A1 | 2/2008 | Yoshizawa |
| 2008/0045320 A1 | 2/2008 | Kato |
| 2008/0108408 A1 | 5/2008 | Wolf |
| 2008/0108411 A1 | 5/2008 | Jensen et al. |
| 2008/0108422 A1 | 5/2008 | Hedrick et al. |
| 2008/0108431 A1 | 5/2008 | Cuddy et al. |
| 2008/0132321 A1 | 6/2008 | Pau |
| 2008/0182647 A1 | 7/2008 | Brunet De Courssou et al. |
| 2008/0274789 A1 | 11/2008 | Singer et al. |
| 2009/0036208 A1 | 2/2009 | Pennington et al. |
| 2009/0156287 A1 | 6/2009 | Baumgartner |
| 2009/0181755 A1 | 7/2009 | Gagner et al. |
| 2009/0239634 A1 | 9/2009 | Nguyen |
| 2009/0291741 A1 | 11/2009 | Schofield |
| 2010/0075737 A1 | 3/2010 | Bluemel |
| 2010/0113133 A1 | 5/2010 | Leupp |
| 2010/0167815 A1 | 7/2010 | Gagner et al. |
| 2010/0203948 A1 | 8/2010 | Falciglia, Sr. |
| 2010/0210343 A1 | 8/2010 | Englman et al. |
| 2010/0234092 A1 | 9/2010 | Gomez et al. |
| 2010/0304832 A1 | 12/2010 | Kup-Ferroth |
| 2011/0244943 A1 | 10/2011 | Milford et al. |
| 2011/0300937 A1 | 12/2011 | Crowder, Jr. et al. |
| 2012/0015707 A1 | 1/2012 | Hornik et al. |
| 2012/0034965 A1 | 2/2012 | Masen et al. |
| 2012/0077564 A1 | 3/2012 | Collette et al. |
| 2012/0094738 A1 | 4/2012 | Aoki et al. |
| 2012/0122532 A1 | 5/2012 | Berman et al. |
| 2012/0178517 A1 | 7/2012 | Montenegro et al. |
| 2012/0220360 A1 | 8/2012 | Kelly et al. |
| 2013/0053124 A1 | 2/2013 | Masen et al. |
| 2013/0065663 A1 | 3/2013 | Johnson et al. |
| 2013/0102375 A1 | 4/2013 | Aoki et al. |
| 2013/0252704 A1 | 9/2013 | Gilbertson et al. |
| 2013/0260861 A1 | 10/2013 | Vann et al. |
| 2013/0324217 A1 | 12/2013 | Gilbertson et al. |
| 2014/0014186 A1 | 1/2014 | Bhattacharya et al. |
| 2014/0024429 A1 | 1/2014 | Aoki et al. |
| 2014/0051496 A1 | 2/2014 | Meyer |
| 2014/0141860 A1 | 5/2014 | Meyer |
| 2014/0179396 A1 | 6/2014 | Aoki et al. |
| 2014/0274292 A1 | 9/2014 | Suda |
| 2014/0323198 A1 | 10/2014 | Tuck |
| 2015/0031437 A1 | 1/2015 | Gomez et al. |
| 2015/0170462 A1 | 6/2015 | Berman et al. |
| 2015/0206386 A1 | 7/2015 | Jaffe et al. |
| 2015/0269809 A1 | 9/2015 | Smith |
| 2015/0287269 A1 | 10/2015 | Berman |
| 2015/0356833 A1 | 12/2015 | Aoki et al. |
| 2015/0379831 A1 | 12/2015 | Lee et al. |
| 2016/0042597 A1 | 2/2016 | Olive |

(56) References Cited

U.S. PATENT DOCUMENTS

| | | | |
|---|---|---|---|
| 2016/0125693 A1* | 5/2016 | Berman | G06F 3/04817 463/21 |
| 2016/0155303 A1 | 6/2016 | Aoki et al. | |
| 2017/0154498 A1 | 6/2017 | Olive | |
| 2017/0372558 A1 | 12/2017 | You et al. | |
| 2018/0130303 A1 | 5/2018 | Lamb | |
| 2018/0268655 A1 | 9/2018 | Olive | |
| 2018/0268659 A1 | 9/2018 | Chesworth et al. | |
| 2019/0102992 A1 | 4/2019 | You et al. | |
| 2019/0236905 A1 | 8/2019 | Washington et al. | |
| 2019/0304244 A1* | 10/2019 | Kennedy | G07F 17/3244 |
| 2021/0217272 A1* | 7/2021 | Sanborn | G07F 17/3267 |
| 2021/0350678 A1* | 11/2021 | Warms | G07F 17/3265 |

FOREIGN PATENT DOCUMENTS

| | | |
|---|---|---|
| AU | 2014202042 A1 | 5/2014 |
| AU | 2015210489 A1 | 2/2016 |
| GB | 2097160 A | 10/1982 |
| GB | 2097160 B | 5/1984 |
| GB | 2144568 A | 3/1985 |
| GB | 2144568 B | 9/1985 |
| GB | 2251112 A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Product Sheet for "Vikings Creed," Released Oct. 2020, Slotmill Limited.
"Jack and the Beanstalk" Game Sheet, Copyright 2017 NetEnt Product Services Ltd.

\* cited by examiner (FIRST GAME CYCLE: REELS SPINNING)

(FIRST GAME CYCLE: REELS STOPPED)

(SECOND GAME CYCLE: REELS SPINNING)

(SECOND GAME CYCLE: REELS STOPPED)

(THIRD GAME CYCLE: REELS SPINNING)

(THIRD GAME CYCLE: REELS STOPPED)

GAMING MACHINE AND METHOD WITH MOVING PERSISTENT SYMBOLS AND WIN ZONE FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, LNW Gaming, Inc.

FIELD OF THE INVENTION

The present invention relates to a technological improvement to gaming systems, gaming machines, and methods and, more particularly, to new and improved animations in connection with a symbol array feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided a gaming system, gaming machine, and method that presents a plurality of symbols in an array corresponding to a plurality of symbol-bearing reels. Game-logic circuitry can position a persistent symbol at a first symbol position in the array. Using a random number generator, the game logic-circuitry spins and stops the reels. Concurrently with the moving of the reels, the game-logic circuitry moves the persistent symbol from the first symbol position in the array to a second symbol position in the array. The game-logic circuitry moves the persistent symbol in a direction toward a win zone outside of the array. The game-logic circuitry further determines whether a catalyst symbol appears in the win zone. In response to determining that the catalyst symbol appears in the win zone, the game-logic circuitry awards a value associated with the persistent symbol.

Additional aspects of the invention will be apparent to those of ordinary skill in the art in view of the detailed description of various embodiments, which is made with reference to the drawings, a brief description of which is provided below.

Figure 1:
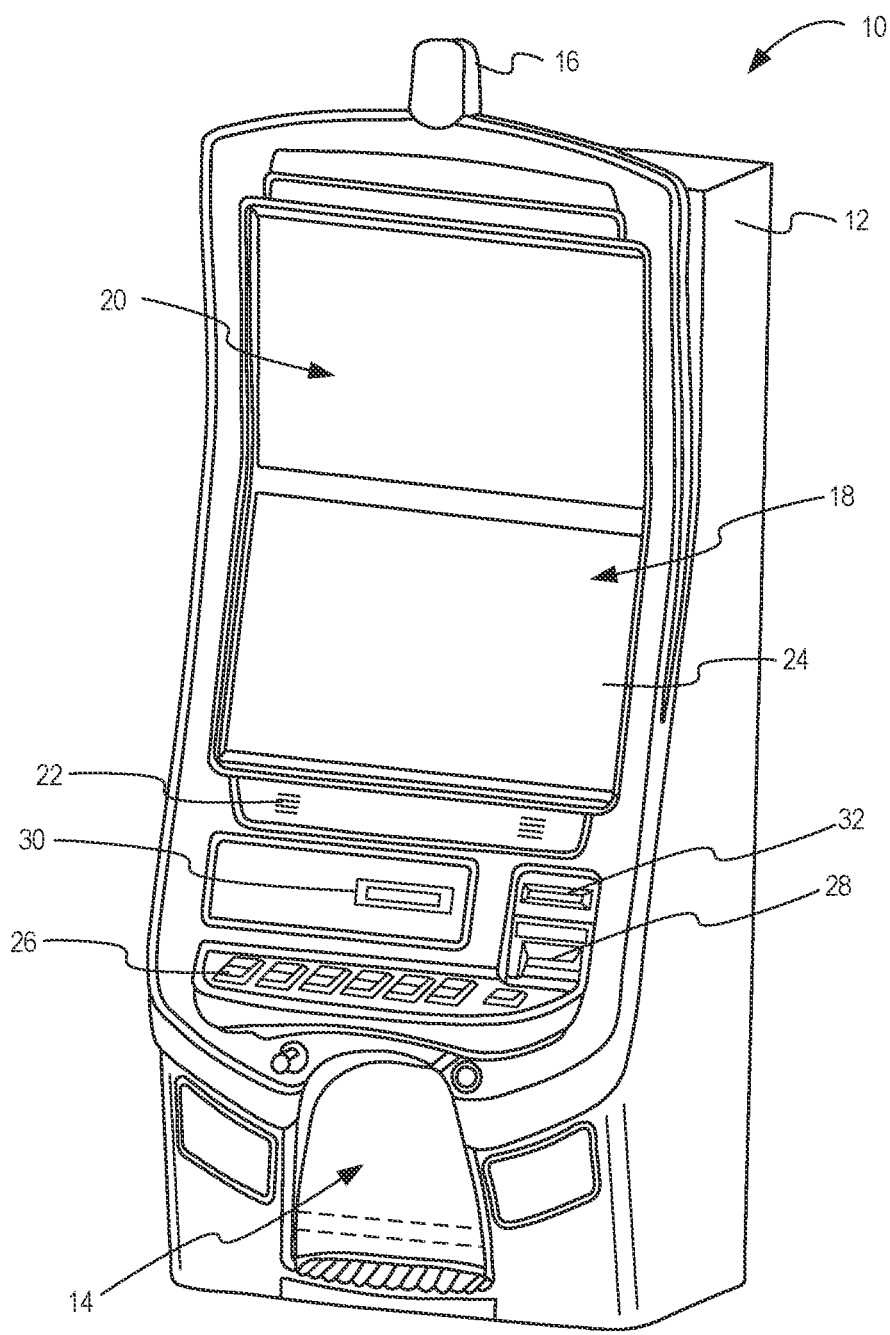
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are each incorporated herein by reference in their respective entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry 40 for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter (e.g., credit meter 200 shown in FIGS. 4A and 5A-7B). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the credit meter (e.g., credit meter 200), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
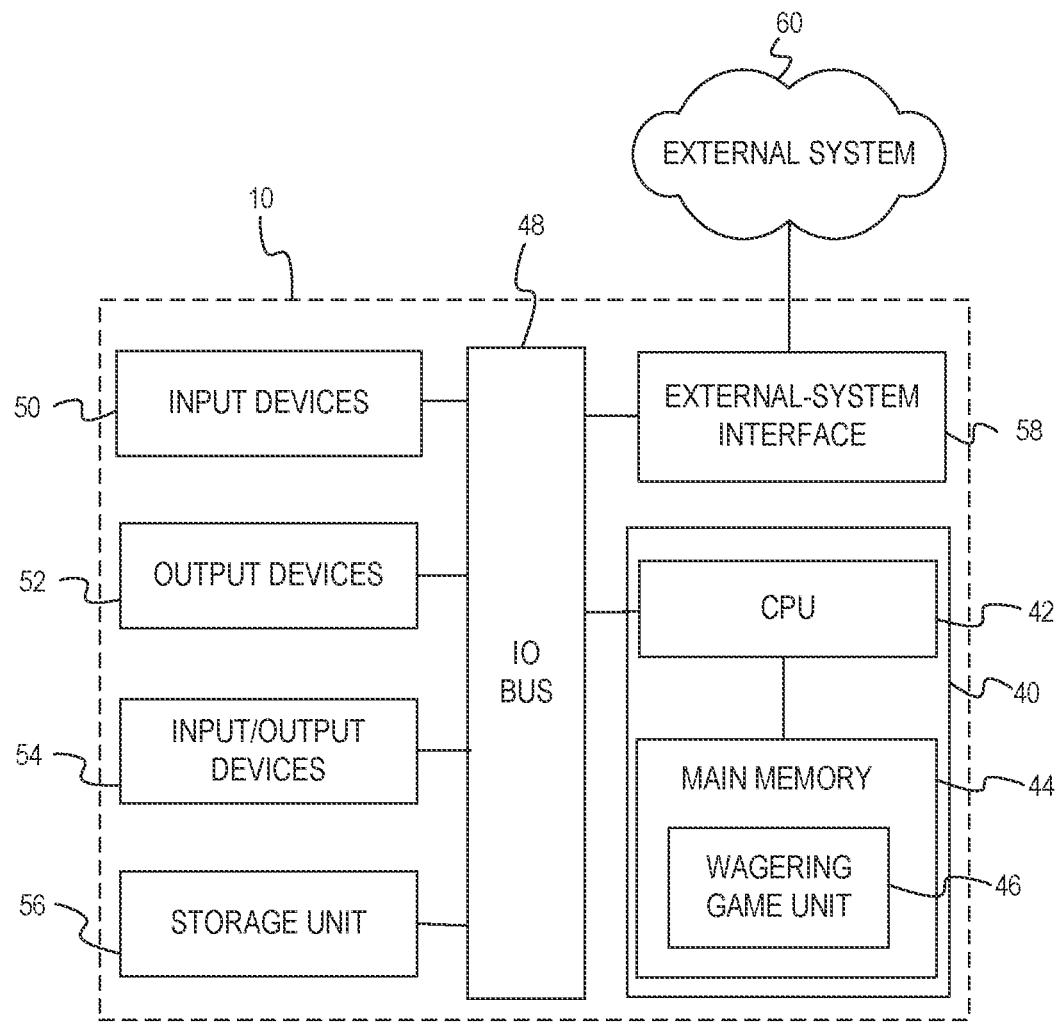
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40 whether located within ("thick client"), external to ("thin client"), or distributed both within and external to ("intermediate client") the gaming machine 10 is utilized to provide a wagering game on the gaming machine 10. In general, the main memory 44 stores programming for a random number generator (RNG), game-outcome logic, and game assets (e.g., art, sound, etc.) all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry 40 facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers desktop PCs, laptops, and tablets).

Figure 3:
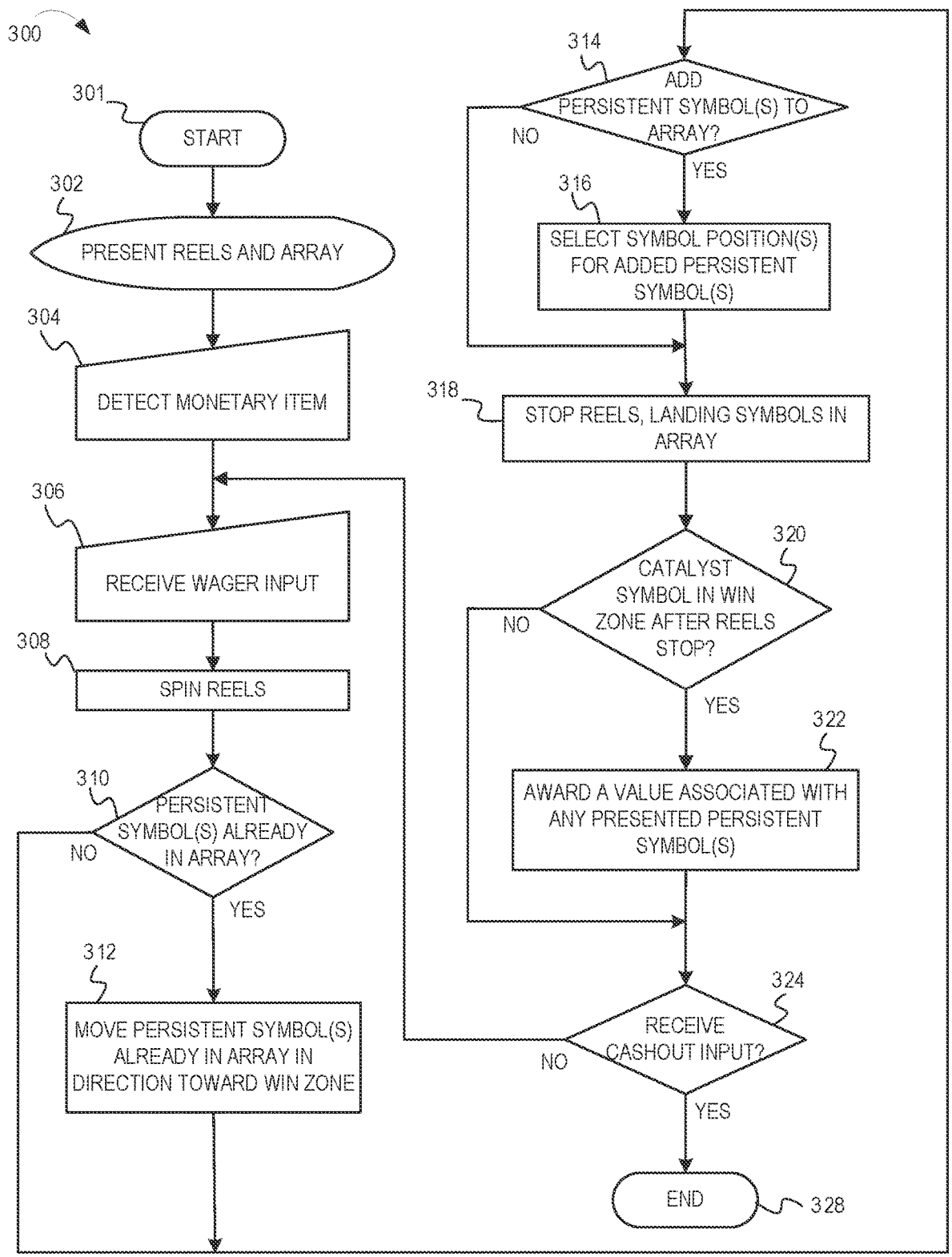
FIG. 3 is a flowchart for an algorithm that corresponds to instructions executed by a controller, according to an embodiment of the present invention.
Figure 4A:
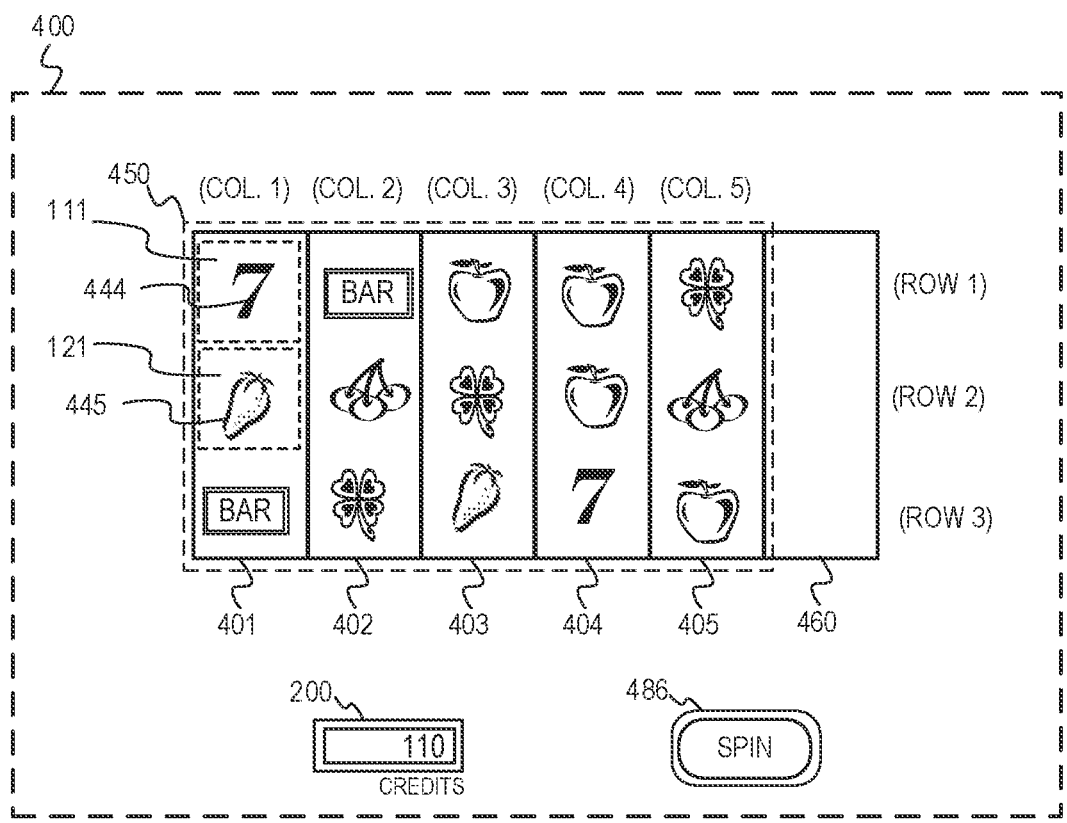
FIGS. 4A, 4B, 5A, 5B, 6A, 6B, 7A, and 7B are diagrams of game features illustrating aspects of the embodiment in FIG. 3.
Figure 5A:
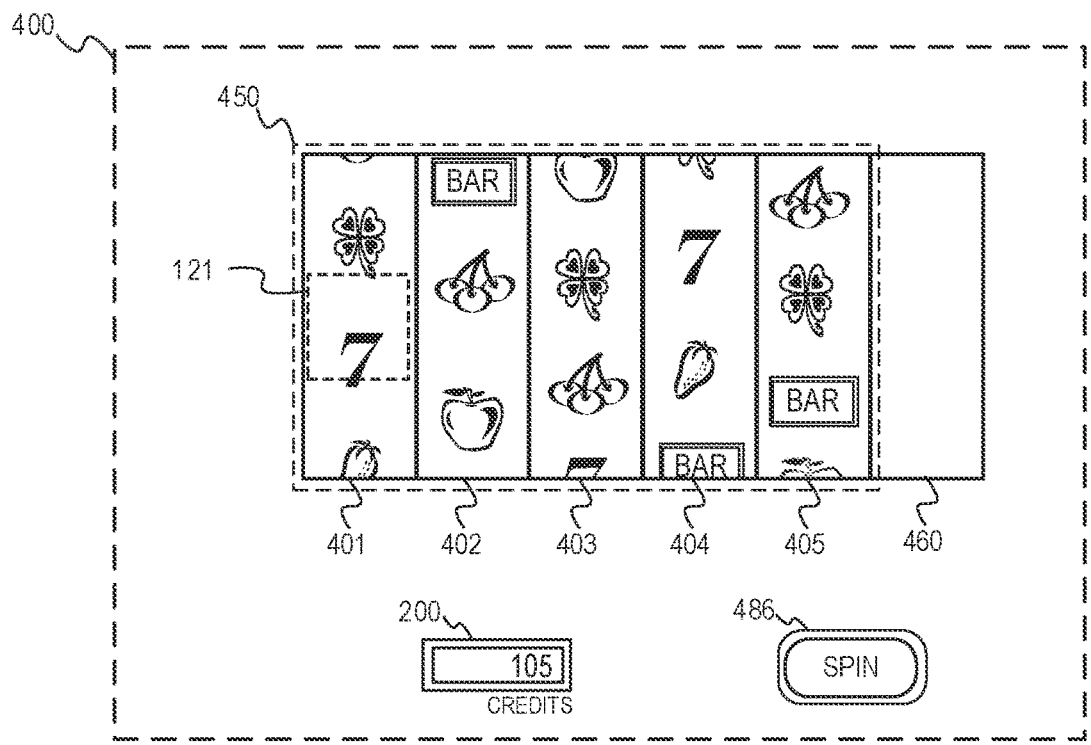
Figure 5B:
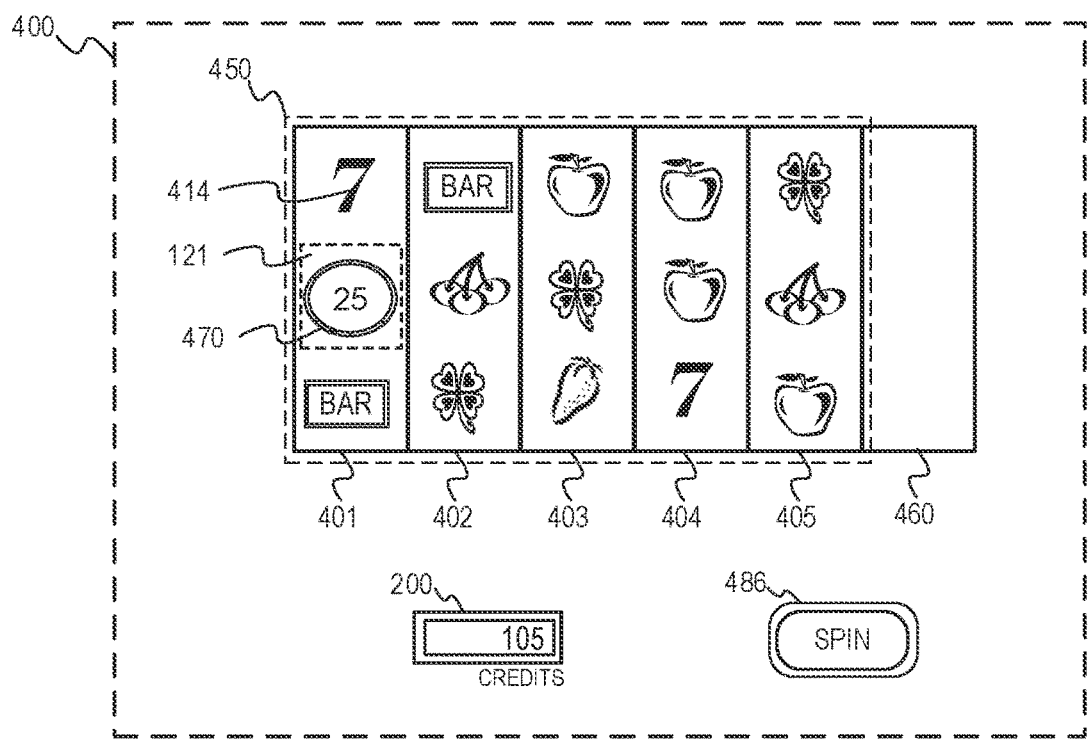
Figure 6A:
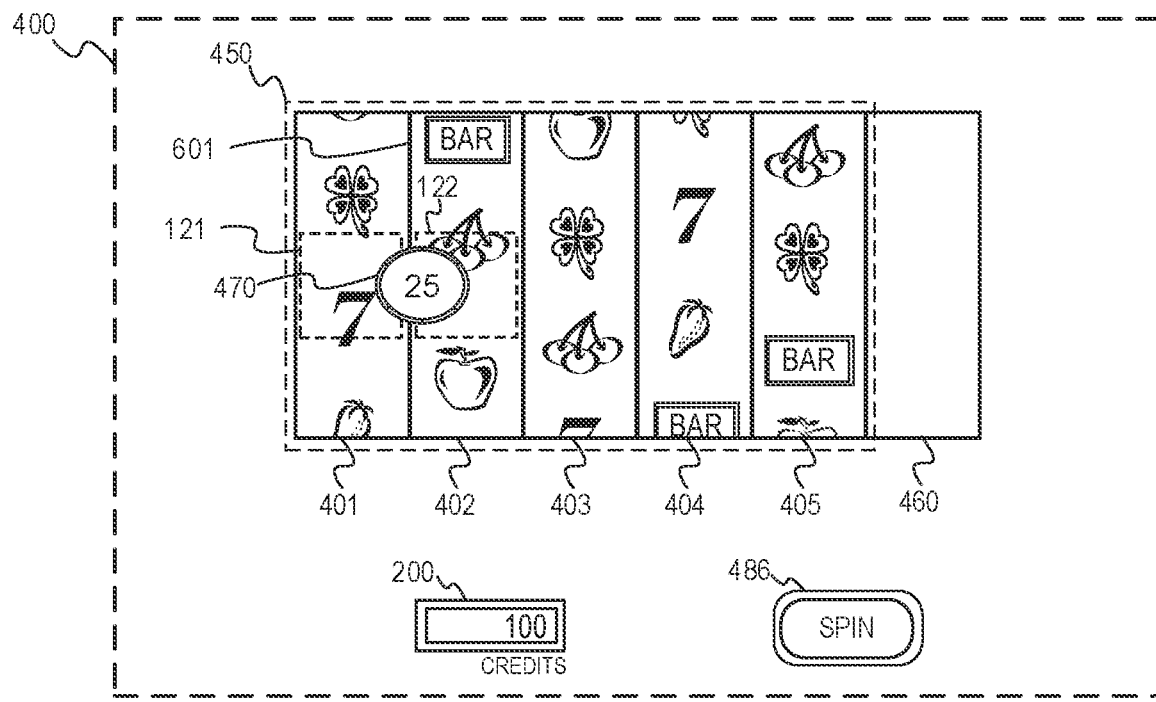
Figure 6B:
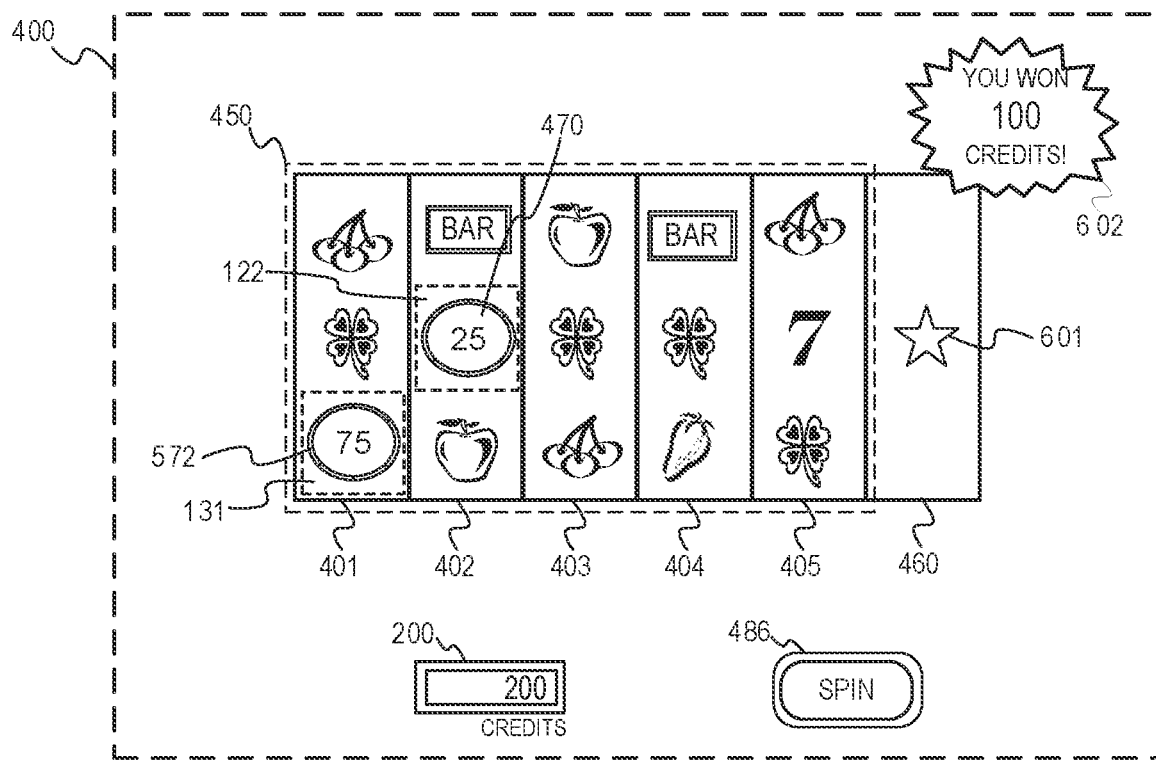
Figure 7A:
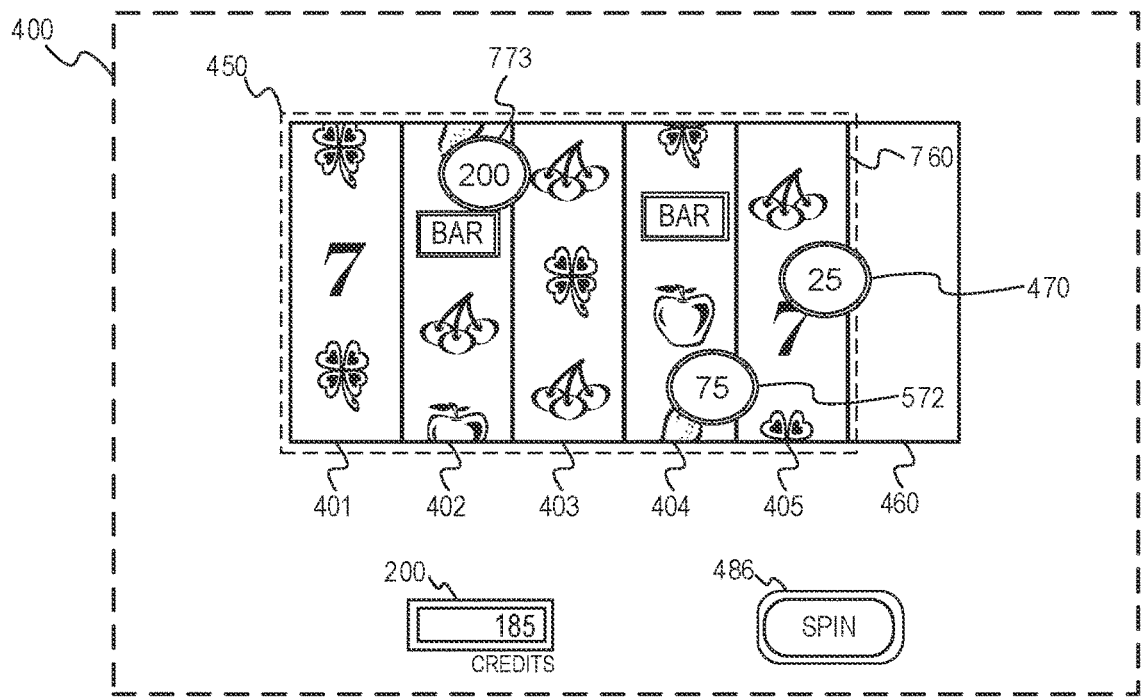
Figure 7B:
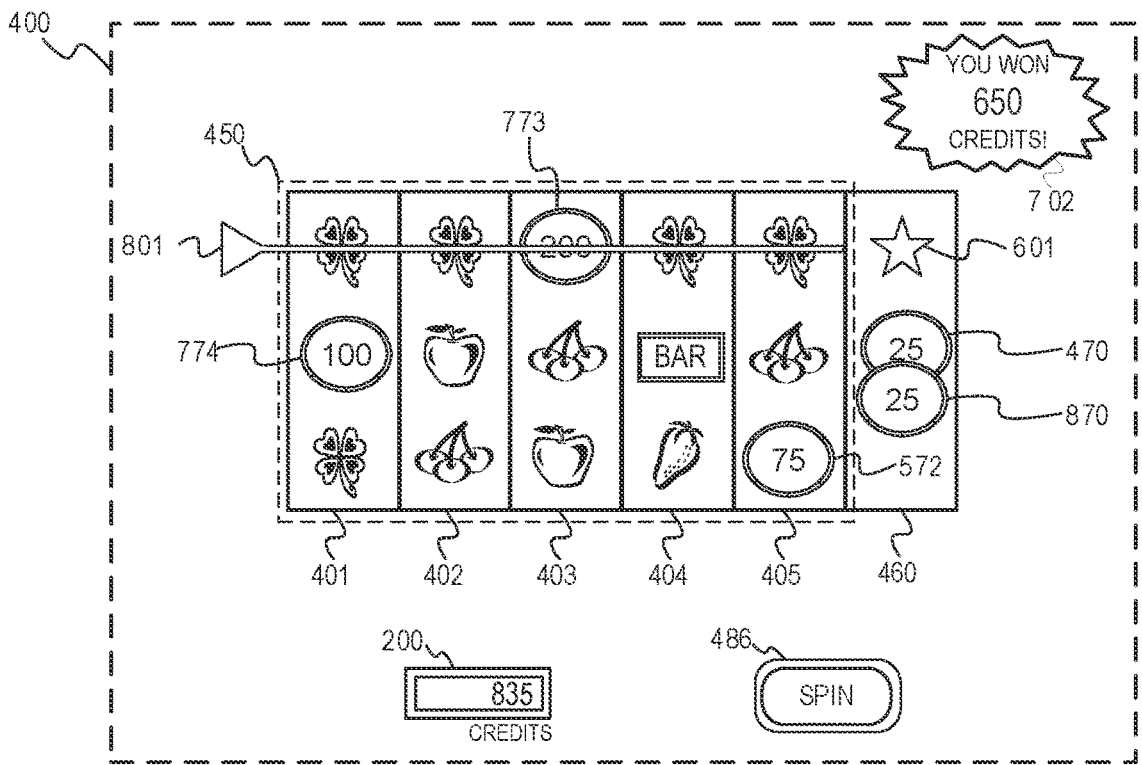

Referring now to FIG. 3, there is shown a flowchart representing one data processing method flow ("flow 300") corresponding to at least some instructions stored and executed by the game-logic circuitry 40 in FIG. 2 to perform operations according to an embodiment of the present invention. The data processing method is described below in connection with an exemplary representation of a series of game cycle outcomes (i.e., "spin outcomes" or "game cycles") as illustrated in FIGS. 4A, 5A, 5B, 6A, 6B, 7A, and 7B. For instance, FIG. 4A illustrates an example of an array 450 before a first game cycle. FIGS. 5A and 5B illustrate an occurrence of the first game cycle (i.e., a first cycle of the flow 300) that positions a persistent symbol 470 in a game array 450. FIGS. 6A and 6B illustrate an occurrence of a second game cycle (i.e., a second cycle of the flow 300), that occurs after the first game cycle. During the second game cycle, the game-logic circuitry 40 moves the persistent symbol 470 from a first symbol position 121 in the array 450 to a second symbol position 422 in the array 450 toward a win zone 460. Further, during the second game cycle, the game-logic circuitry 40 presents a catalyst symbol 601 and awards a value associated with the persistent symbol 470 (and with any additional persistent symbols in the array 450). FIG. 7A and FIG. 7B illustrate an occurrence of third game cycle (i.e., a third cycle of the flow 300), that occurs several interim game cycles after the second game cycle. During the third game cycle, the game-logic circuitry 40 moves the persistent symbol 470 into the win zone 460. Further, during the third game cycle, the catalyst symbol 601 appears a second time. In response to appearance of the catalyst symbol 601, the game-logic circuitry 40 modifies the persistent symbol 470 (e.g., duplicates the persistent symbol 470) and also awards values associated with multiple persistent symbols.

Referring to FIG. 3, the flow 300 commences at processing block 301. At processing block 302, the game-logic circuitry 40 controls one or more presentation devices (e.g., mechanical-reel display device, video display device, or a combination thereof) that present a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the example shown in FIGS. 4A, 5A, 5B, 6A, 6B, 7A, and 7B, a presentation device 400 presents a three-by-five array (array 450) comprising three rows and five columns. Each column is associated with a respective reel (e.g. from the five symbol bearing reels 401, 402, 403, 404, and 405) such that the reel populates the three symbol positions in the associated column. As shown in FIG. 4A, the reels 401, 402, 403, 404, and 405 bear a plurality of symbols. The five symbol-bearing reels 401, 402, 403, 404, and 405 are arranged from left to right. The symbol positions in each row of the array 450 are horizontally aligned with each other, and the symbol positions in each column of the array 450 are vertically aligned with each other. The reels 401, 402, 403, 404, and 405 may be associated with the respective columns of the array 450 such that the reels 401, 402, 403, 404, and 405 spin vertically and each reel populates a respective column. The reel spin presents symbol-bearing, strips moving vertically across the presentation device 400 and synchronously updating the symbols visible on each strip as the strip moves across the display. In another embodiment, the reels 401, 402, 403, 404, and 405 may be associated with the respective rows of the array 450 such that the reels 401, 402, 403, 404, and 405 spin horizontally and each reel populates a respective row. In yet another embodiment, the reels 401, 402, 403, 404, and 405 may be associated with respective individual symbol positions of the array such that each reel populates only its respective symbol position.

Figure 4B:
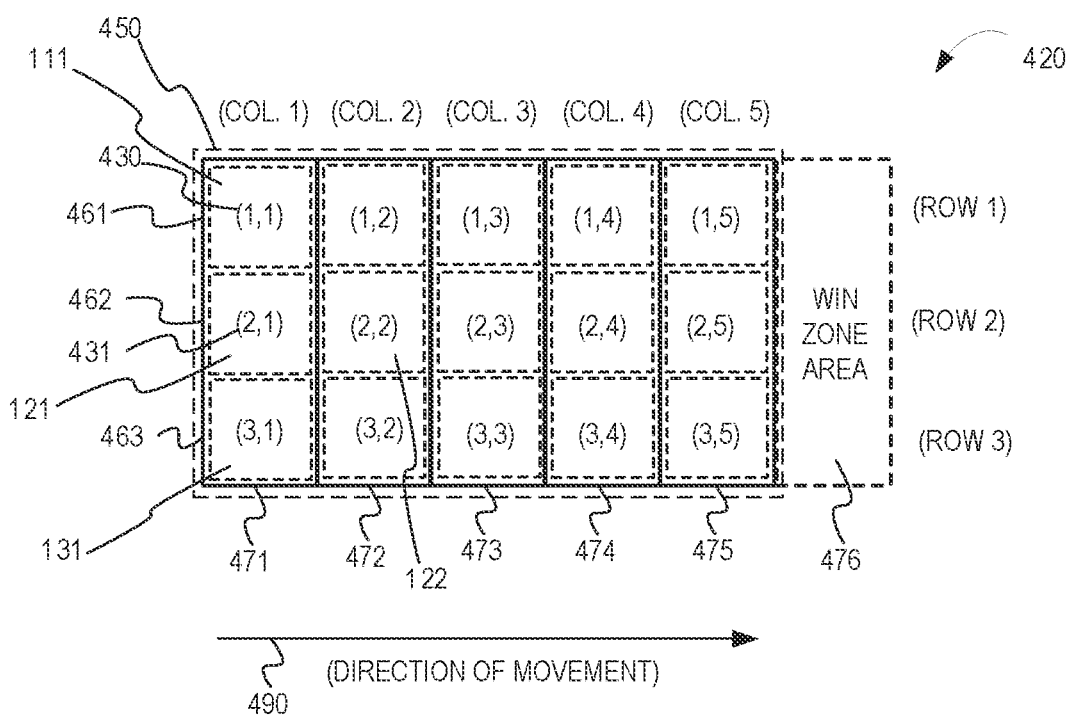

FIG. 4B illustrates an example game array model 420 having columns 471, 472, 473, 474, and 475 (which are vertically oriented) and rows 461, 462, and 463 (which are horizontally oriented). The game array model 420 may be used as a template for positioning symbols and/or as a reference for moving a persistent symbol within the array 450 in a pre-configured direction of movement 490 toward a pre-configured win zone area 476. The win zone area 476 corresponds, in the model 420, to the area of the win zone 460 presented via the presentation device 400. Each element (or entry) of the array model 420 has a respective index value representing symbol positions of the array 450. Each of the symbol positions corresponds to a respective array entry location, thus to a unique array index value, which can be considered in this description as coordinates, or location points, at which to position and present symbols via the presentation device 400. The columns 471, 472, 473, 474, and 475 correspond, or map, to the positions, orientation, borders, etc. of the reels 401, 402, 403, 404, and 405. For example, column 471 may be considered a first column, and row 461 may be considered a first row, thus the index value 430 (i.e., "(1,1)") refers to the index value for a symbol position 111 of the first column and the first row of the game array model 420. Thus, the array entry for the index value 430 (i.e., "(1,1)") corresponds to a symbol position 111, which the game logic-circuitry 40 references to position the symbol 444 in the array 450; the array entry for the index value 431 (i.e., "(2,1)") corresponds to a symbol position 121, which the game-logic circuitry 40 references to position the symbol 445 in the array 450; and so forth. In other words, the game-logic circuitry 40 refers to coordinates and dimensions for the first symbol position 111 stored in association with the index value 430 from the game array model 420; the game-logic circuitry refers to coordinates and dimensions for the second symbol position 121 stored in association with the index value 431; and so forth.

The game array model 420 may be used (e.g., by the game-logic circuitry 40, by the presentation device 400, etc.) for relative positioning of game symbols used in a base game. The game array model 420 may also be used for relative positioning of overlying, persistent symbols which travel from symbol position to symbol position until reaching the win zone 460. For example, the game-logic circuitry 40 can use the game array model 420 to position symbols (including base game symbols and persistent symbols) on coordinates of a video display area that correspond to the symbol positions of the array 450. The game-logic circuitry 40 can further use the game array model 420 to position catalyst symbols at coordinates of a video display area associated with win zone 460. The game-logic circuitry 40 can further use the game array model 420 to position catalyst symbols on coordinates of a video display area associated with the win zone 460. The video display areas may be positioned on the same video display device or in combination with one or more additional video display devices (e.g., separate video devices for each reel). In another example, the game-logic circuitry 40 can use the game array model 420 to position persistent symbols at coordinates on a transmissive video positioned and affixed in front of a mechanical-reel display (e.g., as in aforementioned U.S. Pat. No. 6,517,433). The coordinates correspond to the symbol positions in the array 450. The transmissive video display can portray a video image of the persistent symbol in front of electromechanical reels that bear the symbols for base game on the reels. The persistent symbol can travel across the superimposed transmissive video and, from the viewer's perspective, the persistent symbol appears to travel across the boundaries of reels. In another example, the game-logic circuitry 40 can use the game array model to project an image of the persistent symbol at coordinates for symbol positions of the array on the reels as well as at coordinate positions in-between the symbol positions to display a continuous movement of the persistent symbol across reel boundaries. The game-logic circuitry 40 can use a projector device and a projection layer (e.g., a transparent layer for projection from behind or a screen layer for projection from in front) on which to project images of either base game symbols or persistent symbols (e.g., see aforementioned U.S. Pat. No. 7,654,899). In yet another example, the game-logic circuitry 40 presents electronic images of symbols on miniature video displays mounted to electro-mechanical reels. A miniature video display can be used for each of the reels (e.g., see aforementioned U.S. Pat. No. 7,452,276). The game-logic circuitry 40 can present an image of the persistent symbol at coordinates of more than one miniature video display at a time to depict movement toward a win zone. The persistent symbol can move gradually off of one miniature display to another. Further, a symbol region on a reel can have first features that that are visible in response to exposure at a certain wavelength or polarization of light and second features that are visible in response to exposure to a second wavelength or a second polarization of light. The first features define a first symbol in the symbol location (e.g., the base game symbol) and the second features define a second symbol in the symbol location (e.g., the persistent symbol) (e.g., see aforementioned U.S. Pat. No. 7,452,276). In another example, a flexible display, such as OLED or e-paper display, is affixed to electro-mechanical reels (e.g. see aforementioned U.S. Pat. No. 8,591,330). The game-logic circuitry 40 can present, and move, the persistent symbol at coordinates of the OLED or e-paper display that correspond to symbol positions. The game-logic circuitry 40 can thus depict movement, via the OLED or e-paper display, of the persistent symbol as it travels across reel boundaries.

Although the game array model 420 illustrates the columns 471, 472, 473, 474, and 475 as vertical and the rows 461, 462, and 463 as horizontal, alternatively, the "rows" of the array may be oriented in a vertical direction, and the "columns" of the array may be oriented in a horizontal direction. Furthermore, the win zone area 476 can be positioned adjacent to a side of the array 450, such as bordering a final column (e.g., column 475 as shown), or in other locations, such as being above the array 450 and/or bordering a top row (e.g., bordering row 461).

Referring again to FIG. 3, at processing block 304, the game-logic circuitry 40 detects, via at least one of one or more electronic input devices, a physical item associated with a monetary value that establishes a credit balance. As shown in FIGS. 4A, 5A, 5B, 6A, 6B, 7A, and 7B, the credit balance may be shown on the credit meter 200.

At processing block 306, the game-logic circuitry 40 initiates a wagering game cycle in response to an input indicative of a wager covered by the credit balance. To initiate a spin of the reels, the player may press a "Spin" or "Max Bet" key on a button panel or touch screen (e.g., the spin button 486).

At processing block 308, the game-logic circuitry 40 spins, using an RNG, the reels. For example, as in FIG. 5A, in response to a player pressing the spin button 486, the game-logic circuitry 40 causes the reels to being spinning.

Referring again to FIG. 3, at processing block 310, the game-logic circuitry 40 determines whether there are already any persistent symbols that were previously added to, and still persist in, the array from a previous game cycle. If, at processing block 310, the game-logic circuitry 40 determines that there are already one or more persistent symbols in the array from a previous game cycle, the flow 300 continues at processing block 312, where the game-logic circuitry 40 moves the persistent symbol(s) in a direction toward the win zone (e.g., see FIGS. 6A and 6B, or FIGS. 7A and 7B). If, at processing block 310, the game-logic circuitry 40 determines that there are no persistent symbols in the array from a previous game cycle, then, the flow 300 continues at processing block 314 where the game-logic circuitry 40 determines (e.g., via a RNG) whether to add one or more persistent symbols to the array. If the game-logic circuitry 40 determines to add any persistent symbols, the flow 300 continues at processing block 316 where the game-logic circuitry 40 selects a symbol position(s) at which to position the added persistent symbol(s) (e.g., see, FIG. 5A) and adds the persistent symbol(s) to the array (e.g., see FIG. 5B).

FIGS. 5A and 5B illustrates an example of the flow elements 314 and 316 during the first game cycle. Referring to FIG. 5A, the game-logic circuitry 40 determines, (according to the RNG used for base-game symbol placement, a separate RNG associated with a bonus game feature, or any combination) to add the persistent symbol 470. In response to determining to add the persistent symbol 470, the game-logic circuitry 40 selects the symbol position 121 at random from the symbol positions in the array 450. Because there are no persistent symbols already in the array 450, the game-logic circuitry 40 can select, at random, from any given symbol position on the array 450. The symbol position 121 corresponds to the first row and second column of the array 450 (e.g., which, as shown in FIG. 4B, corresponds to the index entry location "(2,1)" of the game array model 420).

Referring back to FIG. 3, at processing block 318, the game-logic circuitry 40 stops the reels to randomly land (i.e., populate) symbols of the reels in the array. In some embodiments, the symbols land in visual association with one or more paylines (also known as lines, ways, patterns, or arrangements). The game-logic circuit 40 is configured to evaluate the presented array of symbols and provide immediate awards and bonus games in accordance with a pay table. The pay table may, for example, include "line pays" or "scatter pays." Line pays occur when a predetermined type and number of symbols appear along an activated payline, typically in a particular order such as left to right, tight to left, top to bottom, bottom to top, etc. Scatter pays occur when a predetermined type and number of symbols appear anywhere in the displayed array without regard to position or paylines. Similarly, the wagering game may trigger bonus games based on one or more bonus triggering symbols appearing along an activated payline "line trigger") or anywhere in the displayed array (i.e., "scatter trigger"). The wagering game may also provide mystery awards and features independent of the symbols appearing in the displayed array. Each payline preferably consists of a single symbol position in each column of the array. The number of paylines may be as few as one or as many as possible given each payline consists of a single symbol position in each column of the array. In a 3×5 array with three rows and five columns, the maximum number of such paylines is $3^5=243$ lines. In some embodiments, the game-logic circuitry 40 determines awards based on a pre-configured subset of the possible paylines.

As shown in FIG. 5B, the game-logic circuitry 40 presents the persistent symbol 470 at the first symbol position 121. In one embodiment, when the first reel 401 stops spinning, the game-logic circuitry 40 lands the persistent symbol 470 in the array 450, similar to that of an underlying base game symbol. The game-logic circuitry 40 lands the persistent symbol 470 based on the selected symbol position 121 and based on a known timing of the reel spins. In other embodiments, the game-logic circuitry 40 causes persistent symbols to emerge, or originate, at random times from a consistent location, such as from the left-hand side of the array 450, or from below the bottom of the array 450.

In some embodiments, the game-logic circuitry 40 uses the game array model 420 to determine precise coordinates and/or dimensions for the symbol position 121. The game-logic circuitry 40 positions (e.g. superimposes) the persistent symbol 470 at the symbol position 121 according to the timing of the movement and stopping of the reel 402. In one embodiment, the game-logic circuitry 40 times the positioning of the persistent symbol 470 to obscure an underlying symbol that lands on the reel 401 at symbol position 121 (or in some embodiments to replace a base game symbol that would have landed at the symbol position 121). For instance, the game-logic circuitry 40 can position the persistent symbol 470 slightly prior to the stopping of the reel 401. In some embodiments, the game-logic circuitry 40 can time the positioning of the persistent symbol 470 to appear to track the movement of the reel 401 as it slows to a stop, and thus, can the cause the persistent symbol 470 to appear in the array 450 in a way that tracks, or mirrors, the slowing movement of the spinning reel 401.

In some embodiments, the persistent symbol 470 is a special symbol that appears on (e.g., superimposed over) the array for a given number of game plays. In some embodiments, the special symbol includes a value, thereon, to indicate a what-you-see-is-what-you-get (WYSIWYG) visual presentation. The special symbol may be, for example, a value-bearing symbol that bears (or displays) a specific credit value (which credit value can vary per symbol). In some embodiments, the persistent symbol comprises a credit placeholder (e.g., a jackpot indicator symbol that refers to a progressive jackpot value). In the example illustrated in FIG. 5B, the symbol 470 is a value-bearing symbol that bears a value of "25" which represents twenty-five game credits. Furthermore, the persistent symbol is configured to move around the array. For instance, the persistent symbol 470 will travel across the array 450 in subsequent game cycles see FIGS. 6A and 6B and FIGS. 7A and 7B).

FIGS. 6A and 6B illustrates one example of the flow elements 310 and 312 to move one or more already presented persistent symbols. For example, during the first game cycle (e.g., as FIG. 5A and FIG. 5B) the persistent symbol 470 was positioned in the array 450 at symbol position 121. During the second game cycle, as shown in FIGS. 6A and 6B the game-logic circuitry 40 moves the persistent symbol 470 from the first symbol position 121 to the second symbol position 122 concurrently with the spinning of the reels 401, 402, 403, 404, and 405. The moving is in a direction toward the win zone 460 (which is outside of the array 450). In some embodiments, the persistent symbol 470 persists for a number of game cycles, such as until it reaches and/or leaves the win zone 460. As illustrated in FIG. 6A, the game-logic circuitry 40 initiates the movement of the persistent symbol 470 from the first symbol position 121 When the reels 401, 402, 403, 404, and 405 begin spinning for the second game cycle. The game-logic circuitry 40 causes the persistent symbol 470 to transverse a boundary 601 between the reel 401 and the reel 402 toward the adjacent symbol position 122.

Referring to FIG. 6B, the game-logic circuity 40 terminates the movement of the persistent symbol 470, concurrently with the stopping of the reel 402. The persistent symbol 470 comes to rest (i.e., stops moving) and is superimposed at the second symbol position 122. The game-logic circuitry 40 can also cause additional persistent symbols to appear at random at any symbol position within the array 450 (e.g., where there is not already a persistent symbol at the given symbol position). For example, as illustrated in FIG. 6B, the persistent symbol 572 lands, when the reel 401 stops, at symbol position 131 in the array 450. The game-logic circuitry 40 uses a RNG to determine that the persistent symbol 572 will be placed at the symbol position 113, which corresponds to the third row and first column of the array 450 (e.g., which, as shown in FIG. 4B, corresponds to the index entry location "(3,1)" of the game array model 420). The game-logic circuitry 40 positions the persistent symbol 572 at symbol position 131 in the second game cycle similar to how the game-logic circuitry 40 positioned the persistent symbol 470 at the symbol position 121 in the first game cycle. The persistent symbol 572 will also travel across the array 450 (in subsequent game cycles) similar to that of the persistent symbol 470. The persistent symbol 572 is a value-bearing symbol having a value of "75" meaning seventy-five credits. As illustrated in FIG. 6B, the reel 402 is adjacent to the reel 401, and, thus, the persistent symbol 470 has traveled horizontally. Thus, in one embodiment, the symbol position 122 is horizontally adjacent, within the array, to the symbol position 121. In other embodiments, however, the win zone 460 may be above the array 450 and/or there may be multiple win zones in different orientations relative to the array 450 (e.g., a first win zone may be on a right side of the array 450 and a second win zone may be above the array 450). Thus, in some embodiments, the persistent symbol 470 can travel toward the win zone 460 in any given way (e.g., vertically, horizontally, diagonally), and can travel in a combination of ways (e.g, the game-logic circuitry 40 moves the persistent symbol 470 horizontally for one spinning cycle, then the game-logic circuitry 40 moves the persistent symbol 470 vertically for another spinning cycle, then the game-logic circuitry 40 moves the persistent symbol 470 diagonally for another spinning cycle, etc.).

Referring back to FIG. 3, at processing block 320, the game-logic circuitry 40 determines whether a special type of symbol, referred to as a catalyst symbol, appears in the win zone. The catalyst symbol is a symbol that, when it appears in the win zone, it triggers an award whose value is associated with the persistent symbol. If at processing block 320, the game-logic circuitry 40 determines that a catalyst symbol does not appear in the win zone, then the data processing method continues at to processing block 324. However, if at processing block 320, the game-logic circuitry 40 determines that a catalyst symbol appears in the win zone, then the data processing method proceeds to processing block 322 where the game-logic circuitry 40 awards a value associated with any displayed persistent symbols, such as awarding a credit value displayed on a persistent symbol. In one embodiment, if there are no persistent symbols in the array or in the win zone, the catalyst symbol does not award any values. However, if any persistent symbols are in the array or win zone, the game-logic circuitry awards a value for any or all of the persistent symbols. For example, as shown in FIG. 6B, a catalyst symbol 601 appears in the win zone 460. In one embodiment, if the catalyst symbol 601 appears in the win zone 460 while the persistent symbol is not yet within the win zone 460 (i.e., the persistent symbol 470 is still within the array 450, and has not yet traveled to the win zone 460), the game-logic circuitry 40 awards a credit value associated with one or more persistent symbols presented, such as awarding the credit values shown on persistent symbols 470 and 572. For example, in FIG. 6B, the game-logic circuitry 40 awards a value of one-hundred credits, which is a sum of the "25" credits associated with persistent symbol 470 and the "75" credits associated with the persistent symbol 572. In some embodiments, the persistent symbols 470 and/or 572 can disappear after being awarded or they can continue to persist until reaching the win zone 460 (e.g., for at least one additional game play cycle after entering the win zone 460). The game-logic circuitry 40 can further present a message 602 indicating the award and also adds the won credit values to the credit meter 200.

As mentioned, the catalyst symbol 601 can appear when there are no persistent symbols in the win zone 460, as well as when a persistent symbol enters, or is within, the win zone 460. For example, if the catalyst symbol 601 appears in the win zone 460 while the persistent symbol 470 is entering the win zone 460, then the game-logic circuitry 40 can apply a modifier to the persistent symbol 470 to enhance the value of the persistent symbol 470.

FIGS. 7A and 7B illustrates one example of the persistent symbol 470 entering the win zone 460 (e.g., during the third game cycle). In the example shown in FIGS. 7A and 7B, the third game cycle occurs several (e.g., three) interim game cycles after the second game cycle. In the interim game cycles, one or more additional persistent symbols randomly appeared in the array 450, such as persistent symbol 773. Furthermore, in the interim game cycles, the persistent symbols 470 and 572 traveled multiple symbol positions within the array 450 toward the win zone 460. During the third game cycle, as illustrated in FIG. 7A, as the reels 401, 402, 403, 404, and 405 are spinning, the game-logic circuitry 40 moves the persistent symbol 470 across a border 760 between the array 450 and the win zone 460 and causes the persistent symbol 470 to enter the win zone 460. In FIG. 7B, the reels stop and the persistent symbols 470, 572, and 773 stop travelling. An additional persistent symbol 447 randomly appears in the array 450. Furthermore, the catalyst symbol 601 appears within the win zone 460 while the persistent symbol 470 is in the win zone 460. Consequently, the game-logic circuitry 40 modifies (i.e., enhances) the persistent symbol 470. For example, in response to determining that a catalyst symbol 601 appears in the win zone 460 when the persistent symbol is entering the win zone 460, then the game-logic circuitry 40 applies a multiplier modifier (e.g., having a pre-configured multiple value). For example, the game-logic circuitry 40 duplicates the persistent symbol 470 (e.g., generates persistent symbol 870) and awards the credit values for both the persistent symbol 470 and the persistent symbol 870.

In some embodiments, if the catalyst symbol 601 does not appear in the win zone 460 while a persistent symbol is within the win zone 460, the game-logic circuitry 40 causes the persistent symbol to disappear on the next game cycle.

In some embodiments, in response to determining that a catalyst symbol appears in the win zone, the game-logic circuitry uses a persistent symbol to contribute in some way toward a possible winning reel-stop combination of symbols (e.g., a winning symbol combination along a valid payline in a base game). For example, in response to determining that the catalyst symbol appears in the win zone, the game-logic circuitry 40 uses the persistent symbol as a wild symbol for the base game. For instance, as illustrated in FIG. 7B, the persistent symbol 773 is in a specific symbol position in the middle of the top row of the array 450. Based on the location of the symbol position, when used as a wild, the persistent symbol 773 results in a winning symbol combination for the base game. A pay line indicator 801 appears along the top row of the array 450 to indicate the win. In the example shown, the game-logic circuitry 40 awards a given amount of credits associated with the persistent symbols (i.e., the sum of values for the persistent symbols 470, 870, 572, 773, and 774) and also awards a given amount of credits for the win in the base game (i.e., for the win indicated by the payline indicator 801). The game-logic circuitry 40 also presents a message 702 indicating the amount awarded and adds the awarded credit values to the credit meter 200.

In another embodiment, when moving a persistent symbol, the game game-logic circuitry 40 causes a persistent symbol to cover (superimpose) and block an underlying symbol on the array that could contribute to a possible winning reel-stop combination of symbols across the reels (e.g., toward a possible winning reel-stop combination of symbols indicated by the base game pay table). In other words, in one embodiment, the game-logic circuitry 40 can cause the persistent symbol to be superimposed over the underlying symbol to block underlying symbol from contributing to the possible winning reel-stop combination of symbols.

The game-logic circuitry 40 can further determine when, or in what circumstances, to block the underlying symbol from contributing or whether to use the persistent symbol to contribute to the base game mechanic. For example, embodiments of the invention can be used during play of a base game or during play of a bonus game. In one embodiment, during play of the base game the game-logic circuitry 40 causes the persistent symbol to block the underlying of the underlying symbol, even when a catalyst symbol appears in the win zone. For instance, during play of the base game, the game-logic circuitry 40 can cause the persistent symbol to cover the symbol position so as to obscure the underlying symbol completely. The size of the persistent symbol is sufficiently large and sufficiently opaque to obscure a view of the underlying symbol. The blocking prevents the underlying symbol from being used. However, in another embodiment, such as during a bonus game, the persistent symbol may contribute to and/or replace the underlying symbol. For example, during play of the free-spin games in a bonus round, the game-logic circuitry 40 can use the persistent symbol as a wild symbol value in place of the underlying symbol.

In some embodiments, the persistent symbol appears in addition to the underlying symbol and may combine with, or interact in some visual way with, the underlying symbol. For example, in some embodiments, the underlying symbol may pop through from the underlying position and appear to display some indicia or value indicator of the underlying symbol in connection with the persistent symbol. For instance, in one embodiment, if a special symbol (e.g., a bonus symbol or "free spins" symbol) appears in the underlying symbol position, then the game-logic circuitry 40 can cause the special symbol to momentarily appear above the persistent symbol to indicate a bonus or free spin opportunity. In other embodiments, the game-logic circuitry 40 can cause the persistent symbol to shrink or become opaque so that an underlying symbol can be seen and/or used in the game.

In some embodiments, a bonus feature (e.g., a "free-games" feature)) can be triggered by an appearance of special type of persistent symbol or by a certain number of the persistent symbols within the array.

In some embodiments, the catalyst symbol includes a specific enhancement feature (i.e., a "modifier") attached to it, such as an adder (e.g., to add a credit value), a multiplier (e.g., to multiply a credit value on a value-bearing symbol), a free-game trigger, a retrigger, a jackpot, a jackpot upgrade, an additional persistent symbol, etc. In some embodiments, the game-logic circuitry 40 attaches the modifier to the catalyst symbol and/or utilizes different types of catalyst symbols that may include different types of modifiers, and which may affect some types of persistent symbols in different ways. In some embodiments the modifier is randomly selected. However, in other examples, a specific modifier can be selected and used in a consistent (i.e., non-random) manner for a game feature, such as a specific modifier being tied to a particular win zone.

In some embodiments, after entering the win zone, the value of the persistent symbol remains for a given number of game cycles. In one example, the game-logic circuitry 40 causes the persistent symbol (and its value) to disappear on the next game cycle played after entering the win zone. However, in other embodiments, the persistent symbol and/or its value can persist for a specific amount of time or for multiple game cycles.

In some embodiments, a value of the persistent symbol (e.g, a credit value displayed on the persistent symbol) can be added to a bank of values for the win zone. The bank value can increase over time. In response to a specific game trigger, such as appearance of a specific type of catalyst symbol, the game-logic circuitry 40 awards the bank value.

In some embodiments, the catalyst symbol can be a certain size and/or of a certain type (e.g., different types that can affect only some of the persistent symbols). For example, if a height of the reels consists of three symbol-positions (e.g., each reel displays three vertically stacked symbols), and if the win zone is the height of the reels, then the catalyst symbol may be only specific height, such as the height of one or two symbol positions. Thus, the position of the catalyst symbol can vary as to where it appears within the win zone. If, for instance, the catalyst symbol is only one symbol-position tall, and if, when it appears, it only aligns horizontally with one of the rows of the array, then the game-logic circuitry 40 may cause the catalyst symbol to apply only to persistent symbols in that one particular row, and thus only generates an award for that particular persistent symbol even if there are other persistent symbols in other rows of the array. In another embodiment, when the catalyst symbol appears in the win zone, and if the catalyst symbol is only a specific height, then the game-logic circuitry 40 can award a value for all persistent symbols within the array, and only modify or enhance the persistent symbols that land in (e.g., are captured within) within the win zone and which coincide with the location of the of the catalyst within the win zone. Furthermore, different catalyst symbols can appear stacked (or adjacent) within the win zone. Each different catalyst symbol may correspond to a particular row (or rows) within the array (or to a particular column of the array in the example of a win zone that appears above the array). The game-logic circuitry 40 applies awards, modifiers, enhancements, etc. to each row separately according to the specific type of catalyst symbol that appeared aligned with the specific row.

The catalyst symbol can appear in the win zone or outside of the win zone. For instance, as described in one embodiment, the game-logic circuitry 40 awards the value associated with the persistent symbol in response to the catalyst appearing within the win zone. However, in other embodiments, the catalyst can appear outside of the win zone (e.g., appear in another location outside of the array).

In some embodiments, the win zone appears outside of the array as described previously. However, in other embodiments, a win zone can appear within the array, such as randomly appearing between reels.

In some embodiments, the value associated with persistent symbols can vary and/or can be different in value for different ones of the persistent symbols that appear within the array. For example, some persistent symbols may include credit values, such as for value-bearing symbols. In other examples, persistent symbols can instead be bonus values, such as added spins, multipliers, wilds, etc. In that example, when the catalyst occurs (e.g., appears within the win zone), then the game-logic circuitry 40 can generate different awards based on the different values and/or types of the different persistent symbols. For example, a first persistent symbol may be a credit value while a second persistent symbol is a wild symbol. Thus, when the catalyst appears, the game-logic circuitry 40 awards the credit value of the first persistent symbol and the game-logic circuitry 40 concurrently factors the "wild" into the potential winning combinations associated with the symbols of the base game. If the wild causes a win in the base game, then the game-logic circuitry 40 also awards the win value for the win in the base game. In some embodiments, in response to appearance of the catalyst, the game-logic circuitry 40 awards a credit value of value-bearing types of persistent symbols, whereas other features of specific types of persistent symbols may only be awarded if captured within the win zone (e.g., if the persistent symbol is within the win zone when the catalyst appears).

In one embodiment, the game-logic circuitry 40 causes the persistent symbol to travel randomly in any given direction. In one embodiment, the game-logic circuitry 40 causes the persistent symbol to move within the win zone. For example, after the persistent symbol crosses into the win zone, the game-logic circuitry 40 can cause the persistent symbol to move up or down in the win zone for a specific amount of time, for a specific number of games, or until a specific trigger occurs to clear the persistent symbol from the win zone (e.g., a special symbol randomly appears that removes the persistent symbol(s) from the win zone). In one embodiment, the persistent symbol can also move in a direction away from the win zone momentarily. For example, if a persistent symbol appears within the win zone and does not coincide with the appearance of a catalyst symbol, the game-logic circuitry 40 can move the persistent symbol outside of the win zone, such as back onto the array for an opportunity to move back into the win zone at a later game cycle. For example, in an array populated by a set of five reels, after the persistent symbol enters the win zone from the fifth reel, if the persistent symbol does not coincide with a catalyst symbol upon entry, the game-logic circuitry 40 can move the persistent symbol back onto the fifth reel instead of causing the persistent symbol to disappear on the next game cycle.

Referring again to FIG. 3, at processing block 324, the game-logic circuitry 40 determines whether or not it has received a cashout input via at least one of the one or more electronic input devices of the gaming machine. If it has not received a cashout input, the game-logic circuitry 40 waits for the next wager input at processing block 306. If it has received a cashout input, the game-logic circuitry 40 initiates a payout from the credit balance on the credit meter. The data processing method then ends at processing block 328.

Some embodiments of the inventive subject matter may take the form of an entirely hardware embodiment, an entirely software embodiment (including firmware, resident software, micro-code, etc) or an embodiment combining software and hardware aspects. Furthermore, some embodiments may take the form of a computer program product embodied in any tangible or non-transitory medium of expression having computer readable program code embodied in the medium. The described embodiments may be provided as a computer program product that may include a computer-readable storage medium having stored thereon instructions, which may be used to program a computer system to perform a process according to some embodiments(s), whether presently described or not, because every conceivable variation is not enumerated herein. A computer-readable storage medium includes any mechanism that stores information in a form (e.g., software, processing application) readable by a machine (e.g., a computer). For example, computer-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

Each of these embodiments and obvious variations thereof is contemplated as falling within the spirit and scope of the claimed invention, which is set forth in the following claims. Moreover, the present concepts expressly include any and all combinations and sub-combinations of the preceding elements and aspects.

What is claimed is:

1. A method of operating a gaming machine, the method comprising the operations of:
   presenting, by a presentation assembly, an array associated with a plurality of symbol-bearing reels;
   animating, by the presentation assembly, a persistent symbol at a first symbol position in the array;
   using a random number generator, spinning and stopping the reels to populate the array with symbols from the reels;
   animating movement, concurrently with the spinning of the reels, of the persistent symbol from the first symbol position in the array to a second symbol position in the array;
   animating, by game-logic circuitry, a catalyst symbol in a win zone outside of the array; and
   in response to animating the catalyst symbol in the win zone, animating, by the game-logic circuitry, an increment of a meter using a value associated with the persistent symbol.

2. The method of claim 1, wherein the persistent symbol comprises a value-bearing symbol, and wherein the awarding the value associated with the persistent symbol comprises awarding a credit value indicated on the value-bearing symbol.

3. The method of claim 1, wherein the persistent symbol persists on the array over a plurality of instances of the spinning and stopping of the reels.

4. The method of claim 1, wherein animating the movement comprises animating the movement in a direction toward the win zone.

5. The method of claim 4, wherein the persistent symbol travels horizontally across the reels toward the win zone, wherein the win zone is horizontally adjacent to the array, and wherein the second symbol position is horizontally adjacent, within the array, to the first symbol position.

6. The method of claim 5, wherein the first symbol position is for a first reel of the reels, wherein the second symbol position is for a second reel of the reels, wherein the second reel is adjacent to the first reel, and wherein the animating the movement of the persistent symbol comprises:
   initiating, when the reels begin spinning, movement of the persistent symbol from the first symbol position of the array;
   causing, while the symbol-bearing reels are spinning, the persistent symbol to transverse a boundary between the first reel and the second reel; and
   terminating, concurrently with a stopping of at least the second reel, movement of the persistent symbol at the second symbol position.

7. The method of claim 1, wherein the animating the movement comprises animating the movement in a direction away from the win zone.

8. The method of claim 1, wherein the persistent symbol travels vertically upward toward the win zone, wherein the win zone is adjacent to a top of the at least one of the reels, and wherein the second symbol position is vertically adjacent, within the array, to that of the first symbol position.

9. The method of claim 1 further comprising:
   moving the persistent symbol across a boundary of the array, wherein the moving the persistent symbol across the boundary causes the persistent, symbol to enter the win zone.

10. The method of claim 9, further comprising modifying the persistent symbol in response to the determining that the catalyst symbol and the persistent symbol appear concurrently within the win zone.

11. The method of claim 10, wherein the modifying comprises duplicating the persistent symbol according to pre-configured multiple value; and wherein the awarding comprises awarding, based on the pre-configured multiple value, a multiple of a credit value associated with the persistent symbol.

12. The method of claim 9, wherein the modifying comprises one or more of adding a credit value, multiplying a credit value, awarding a free game, awarding a jackpot, or adding an additional persistent symbol.

13. The method of claim 9 further comprising keeping the persistent symbol within the win zone for at least one additional instance of spinning and stopping of the reels.

14. The method of claim 1 further comprising:
   determining that the catalyst symbol is one type from a plurality of different types of catalyst symbols; and
   modifying the persistent symbol in response to determination that the catalyst symbol is the one type.

15. The method of claim 1 further comprising:
   determining a location within the win zone at which that the catalyst symbol appears; and
   modifying the persistent symbol in response to determining that the location corresponds to one or more of a column or row of the array in which the persistent symbol appears.

16. The method of claim 1, wherein in response to determining that the catalyst symbol appears in the win zone, using the persistent symbol as a wild symbol in the array.

17. The method of claim 16, wherein the animating the movement causes the persistent symbol to cover an underlying one of the plurality of symbols at the second symbol position, and wherein the using the persistent symbol as a wild symbol comprises using the wild symbol in place of the underlying one of the plurality of symbols as a wild toward a potential winning reel-stop combination of symbols indicated by a base game pay table.

18. The method of claim 17, wherein using the persistent symbol as the wild symbol is in response to determining that the spinning and stopping of the reels occurs during a bonus game.

19. A gaming system comprising:
   a gaming machine including a presentation assembly configured to present an array associated with a plurality of symbol-bearing reels; and game-logic circuitry configured to perform the operations of:
  animating a persistent symbol at a first symbol position in the array;
  using a random number generator, spinning and stopping the reels to populate the array with symbols from the reels;
  animating movement, concurrently with the spinning of the reels, of the persistent symbol from the first symbol position in the array to a second symbol position in the array, wherein the moving is in a direction toward a win zone outside of the array;
  animating movement of the persistent symbol across a boundary of the array, wherein animating the movement of the persistent symbol across the boundary causes the persistent symbol to enter the win zone;
  keeping the persistent symbol within the win zone for at least one additional instance of spinning and stopping of the reels; and
  after determining that a catalyst symbol appears in the win zone,
  animating, in response to determining that the catalyst symbol appears in the win zone, an increment of a meter using a value associated with the persistent symbol.

20. One or more non-transitory, computer-readable storage media having instructions stored thereon, which, when executed by a set of one or more processors of a wagering game machine, cause the set of one or more processors to perform operations comprising:
  animating, via a presentation assembly, an array associated with a plurality of symbol-bearing reels;
  animating a persistent symbol at a first symbol position in the array;
  using a random number generator, spinning and stopping the reels to populate the array with symbols from the reels;
  animating movement, concurrently with the spinning of the reels, of the persistent symbol from the first symbol position in the array to a second symbol position in the array, wherein the moving is in a direction toward a win zone outside of the array;
  animating a catalyst symbol in the win zone, wherein in response to animating the catalyst symbol in the win zone, using the persistent symbol as a wild symbol in the array; and
  in response to animating the catalyst symbol in the win zone, animating an increment of a meter using a value associated with the persistent symbol.

\* \* \* \* \*